United States Patent Office 2,945,896
Patented July 19, 1960

2,945,896
FLUOROISOPRENES

Paul Tarrant, Gainesville, Fla., and Raymond P. Lutz, Louisville, Ky., assignors to Research Corporation, New York, N.Y., a corporation of New York No Drawing. Filed Feb. 29, 1956, Ser. No. 568,434

5 Claims. (Cl. 260—653.5)

This invention relates to fluoroisoprenes polymerizable to elastomeric compositions which are resistant to hydrocarbon fuels and retain their elasticity at low temperatures, and to methods and intermediates for making the same.

Commercially available elastomers such as those made from butadiene, styrene, etc. are unsuitable for use at low temperatures and have inadequate resistance to swelling and deterioration in commonly used fuels. Some attention has been given in the past few years to the preparation of elastomers containing fluorine and, in certain instances, improvements have been noted. For example, fluoroprene, which is 2-fluorobutadiene-1,3, is reported to be more resistant to solvents than is butadiene itself. Perfluorobutadiene, $CF_2=CFCF=CF_2$, would seem to be an ideal monomer for polymerization to an elastomeric material but, unfortunately, it gives plastic materials rather than elastomers. One of the difficulties in the use of perfluorobutadiene is its great tendency to form cyclic structures containing one or more cyclobutyl rings.

We have found that fluoroisoprenes of the formula

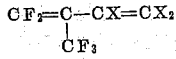

wherein the X's represent hydrogen or fluorine may be polymerized by conventional methods to form homopolymers, or copolymers with such substances as butadiene, which are highly useful elastomers resistant to the commonly used fuels and retaining their elastic properties at low temperatures.

We have found that the fluoroisoprenes of the invention can be made simply, conveniently and in good yields, by condensing a perhalogenated pentafluoropropane of the formula $$CF_2Y'—CClY''—CF_3$$

wherein Y' is bromine or chlorine and Y'' is iodine, bromine or chlorine, with an olefin of the formula $$CHX=CX_2$$

wherein X is hydrogen or fluorine, for example, by heating the reactants in the presence of a carboxylic acid peroxide, to give an halogenated fluoroisopentane of the formula

dehydrohalogenating the fluoroisopentane by heating with an alkali to give a halogenated fluoroisopentene of the formula

and dehalogenating the fluoroisopentene by heating with metallic zinc to give the corresponding fluoroisoprene.

The perhalogenated pentafluoropropanes may be prepared by halogenation of the known 2-chloro-1,1,3,3,3-pentafluoropropene. For example, 598 g. of 2-chloro-1,1,3,3,3-pentafluoropropene is heated in an autoclave with 650 g. of iodine monochloride at 60° C. for 16 hours. The unreacted gas is bled off and the separated organic liquid layer is washed until colorless with cold sodium thiosulfate solution, dried over calcium chloride and distilled through a Claisen head. Hot water is circulated through the condenser as the product is solid at room temperature. 540 g. of 1,2-dichloro-2-iodopentafluoropropane boiling at 118° C. is obtained. After purification by sublimation it melts at 46–48° C.

The following examples are illustrative of the principles of the invention:

Example I

A 300 ml. stainless steel reaction vessel is charged with 215 g. of 1,2-dichloro-2,iodo-1,1,3,3,3-pentafluoropropane, 53.5 g. of trifluoroethylene, and 5 g. of benzoyl peroxide. The vessel is sealed and heated to 85° C. for 3 hours. After the vessel has cooled, unreacted gas is removed through a valve and the liquid contents are filtered and distilled. About 169 g. of the one-to-one addition product, $CF_2ClCCl(CF_3)CHFCF_2I$ is obtained at 67–69° C. at 45 mm. Other physical properties are $n_D^{25}$ 1.4174, $d_4^{25}$ 2.1504, $MR_D$ 48.09 (found) $MR_D$ 47.82 (calculated).

Example II

Into a 500 ml. 3-necked round-bottom flask equipped with a stirrer, addition funnel, and short column with take-off head, is placed 233 g. of

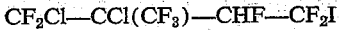

The liquid is heated and 40 g. of potassium hydroxide, dissolved in the least amount of water, is added dropwise. The product is collected as it distills over with water in the range 75–95° C. When all the KOH has been added, the reaction is stirred and heated for 2 hours, during which time the reflux temperature is about 97° C.

The material which has collected is washed with sodium thiosulfate solution until colorless, dried over calcium chloride and distilled. The olefin is obtained at 88–89° C. A considerable amount of high-boiling material remains in the pot and it is treated as before with KOH along with unreacted material which is recovered from the original reaction vessel. The olefinic product, $$CF_2Cl—CCl(CF_3)—CF=CF_2$$

amounts to 65.5 g.; $n_D^{25}$ 1.3394, $d_4^{25}$ 1.727, $MR_D$ 34.29 (found) 34.55 (calculated).

Example III

Into a 300 ml. 3-necked round-bottom flask equipped with a stirrer, addition funnel, and short column with take-off head are placed 23 g. of powdered zinc, 3 g. of zinc chloride, and 50 cc. of isopropyl alcohol. The mixture is stirred and heated and 65.5 g. of $$CF_2Cl—CCl(CF_3)—CF=CF_2$$

is added dropwise. The product distills and is collected at about 30° C. It is then washed with ice water, dried over calcium chloride, and distilled. Perfluoroisoprene, $CF_2=C(CF_3)—CF=CF_2$, amounting to about 15 g. comes over at 30–31° C.; $n_D^0$ 1.3000, $d_4^0$ 1.527, $MR_D$ 25.97 (found), 24.36 (calculated).

Example IV

A 1.4 liter autoclave is charged with 522 g. of 1,2-dichloro-2-iodo-1,1,3,3,3-pentafluoropropane and 23 g. of benzoyl peroxide. The autoclave is sealed and 105 g. of vinylidene fluoride forced into the vessel by the cylinder pressure. The vessel is then heated at 100° C. for 3½ hours, allowed to cool to room temperature, and the unreacted gas allowed to escape. The liquid contents are distilled directly to yield 460.5 g. of the one-to-one adduct, $CF_2Cl—CCl(CF_3)—CH_2—CF_2I$, boiling at 78–79° C.

at 40 mm.; $n_D^{25}$ 1.4308, $d_4^{25}$ 2.098, MR$_D$ 48.45 (found) 47.82 (calculated).

Example V

Into a 500 ml. 3-necked round-bottom flask, equipped as previously described, is placed 84 g. of potassium hydroxide dissolved in the least amount of water. The solution is heated and 350 g. of the above vinylidene fluoride adduct is added dropwise. Liquid distills over and is collected in the range 76–90° C. Total reflux is maintained if the temperature becomes higher than 90° C.; when it does not go below 90° C., even after prolonged reflux, with no addition of adduct, the addition is discontinued completely, the receiver changed, and the flask heated strongly until dry. The liquid which thus comes over is added to the remaining adduct and treated as before with potassium hydroxide. This treatment is carried out a total of three times. The products of the three runs are combined, washed until colorless with cold sodium thiosulfate solution, dried over calcium chloride, and distilled. The desired olefin $$CF_2Cl\text{---}CCl(CF_3)\text{---}CH=CF_2$$

amounting to 88.5 g., boils at 92° C.; $n_D^{25}$ 1.3478, $d_4^{25}$ 1.665, MR$_D$ 34.04 (found) 34.56 (calculated).

Example VI

Into a 300 ml. 3-necked round-bottom flask, equipped as previously described, are placed 50 g. of powdered zinc, 5 g. of zinc chloride, and 100 cc. of isopropyl alcohol. The mixture is stirred and heated and 84 g. of $CF_2Cl\text{---}CCl(CF_3)\text{---}CH=CF_2$ is added dropwise. The product distills and is collected at about 40° C. It is then washed with ice water, dried over calcium chloride and distilled to yield 48.5 g. of the heptafluoroisoprene, $CF_2=C(CF_3)\text{---}CH=CF_2$, which boils at 32.5–33° C.; $n_D^0$ 1.3087, $d_4^0$ 1.494, MR$_D$ 23.82 (found) 24.36 (calculated).

Example VII

A 1.4 liter autoclave is charged with 542 g. of 1,2-dichloro-2-iodo-1,1,3,3,3-pentafluoropropane and 24 g. of benzoyl peroxide and then sealed. Ethylene is forced into the autoclave until the pressure is 400 p.s.i.g. The vessel is heated at 85° C. for 3½ hours, cooled to room temperature, and the unreacted gas is allowed to escape. The liquid contents are distilled directly to yield 417 g. of the adduct, $CF_2Cl\text{---}CCl(CF_3)\text{---}CH_2\text{---}CH_2I$, which boils at 80° C. at 35.5 mm.; $n_D^{25}$ 1.4717, $d_4^{25}$ 2.044, MR$_D$ 48.86 (found) 47.82 (calculated).

Example VIII

Into a 500 ml. 3-necked round-bottom flask, equipped as previously described, is placed 363.5 g. of the ethylene adduct, $CF_2Cl\text{---}CCl(CF_3)\text{---}CH_2\text{---}CH_2I$. It is heated and 84 parts of potassium hydroxide, dissolved in the least amount of ethyl alcohol, is added dropwise. The product distills and is collected at 76–80° C. When all the alcoholic KOH has been added, the temperature rises to 90–100° C. and the flask is heated until dry. The product is washed with very dilute cold sodium thiosulfate solution, dried over calcium chloride, and distilled to yield the olefin, $CF_2Cl\text{---}CCl(CF_3)\text{---}CH=CH_2$, boiling at 96° C. The high boiling material remaining in the distillation pot is again treated with alcoholic potassium hydroxide. The total amount of olefin obtained is 103 g.; $n_D^{25}$ 1.3627, $d_4^{25}$ 1.510, MR$_D$ 34.07 (found) 34.56 (calculated).

Example IX

The procedure and equipment are identical to those used in Example III. The materials used are 88 g. of $CF_2Cl\text{---}CCl(CF_3)\text{---}CH=CH_2$, 52.5 g. of powdered zinc, 5 g. of zinc chloride, and 150 cc. of isopropyl alcohol. The product is removed from the reaction as it distills in the range 34–45° C. It is washed and dried as before to yield 46.5 g. of the pentafluoroisoprene $$CF_2=C(CF_3)\text{---}CH=CH_2$$

which boils at 32–32.5° C.; $n_D^0$ 1.3372, $d_4^0$ 1.310, MR$_D$ 25.11 (found) 24.36 (calculated).

Polymerization of the fluoroisoprenes of the invention may be effected in accordance with known methods of polymerizing diolefinic materials.

The following examples are illustrative:

Example X

A mixture of 100 parts of the product of Example IX, 180 parts of water, 3 parts of Aerosol OT, 0.1 part of $K_2S_2O_8$, 0.3 part of borax and 0.3 part of $t$—$C_{12}$ mercaptan is stirred for 24 hours at 25° C. An elastomeric latex is formed which is worked up in the usual manner.

Example XI

When 50 parts of the product of Example VI and 50 parts of 1,3-butadiene is substituted for the pentafluoroisoprene in Example X an elastomeric copolymer is formed.

We claim:

1. A method of making polymerizable fluoroisoprenes of the formula $$CF_2=C\text{---}C=CX_2$$
$$\phantom{CF_2=C\text{---}}|\phantom{=}|$$
$$\phantom{CF_2=}CF_3\phantom{\text{---}}X$$

wherein the X's are selected from the group consisting of hydrogen and fluorine, which comprises heating a perhalogenated pentafluoropropane of the formula $$CF_2Y'\text{---}CClY''\text{---}CF_3$$

wherein Y' is selected from the group consisting of bromine and chlorine and Y'' is selected from the group consisting of iodine, bromine and chlorine, and with an olefin of the formula $$CHX=CX_2$$

in the presence of a carboxylic acid peroxide to produce a halogenated fluoroisopentane of the formula $$CF_2Y'\text{---}CCl\text{---}CH\text{---}CX_2Y''$$
$$\phantom{CF_2Y'\text{---}}|\phantom{\text{---}CH\text{---}}|$$
$$\phantom{CF_2Y'\text{---}}CF_3\phantom{\text{---}CH\text{---}}X$$

dehydrohalogenating the halogenated fluoroisopentane by heating with an aqueous alkali to produce a halogenated fluoroisopentene of the formula $$CF_2Y'\text{---}CCl\text{---}CX=CX_2$$
$$\phantom{CF_2Y'\text{---}}|$$
$$\phantom{CF_2Y'\text{---}}CF_3$$

and dehalogenating the halogenated fluoroisopentene by heating with metallic zinc to the corresponding fluoroisoprene.

2. A method of making a polymerizable fluoroisoprene of the formula $$CF_2=C\text{---}CF=CF_2$$
$$\phantom{CF_2=}|$$
$$\phantom{CF_2=}CF_3$$

which comprises heating a perhalogenated pentafluoropropane of the formula $CF_2Cl\text{---}ClCl\text{---}CF_3$ with trifluoroethylene in the presence of a carboxylic acid peroxide to produce a halogenated fluoroisopentane of the formula $$CF_2Cl\text{---}CCl\text{---}CHF\text{---}CF_2I$$
$$\phantom{CF_2Cl\text{---}}|$$
$$\phantom{CF_2Cl\text{---}}CF_3$$

dehydrohalogenating the fluoroisopentane by heating with an aqueous alkali to produce a halogenated fluoroisopentene of the formula $$CF_2Cl\text{---}CCl\text{---}CF=CF_2$$
$$\phantom{CF_2Cl\text{---}}|$$
$$\phantom{CF_2Cl\text{---}}CF_3$$

and dehalogenating the fluoroisopentene by heating with metallic zinc to produce the corresponding fluoroisoprene.

3. A method of making a polymerizable fluoroisoprene of the formula $$CF_2=C-CH=CF_2$$
$$\ \ \ \ \ \ |$$
$$\ \ \ \ \ \ CF_3$$

which comprises heating a perhalogenated pentafluoropropane of the formula $CF_2Cl-ClCl-CF_3$ with 1,1-difluoroethylene in the presence of a carboxylic acid peroxide to produce a halogenated fluoro isopentane of the formula $$CF_2Cl-CCl-CH_2-CF_2I$$
$$\ \ \ \ \ \ \ |$$
$$\ \ \ \ \ \ \ CF_3$$

dehydrohalogenating the fluoroisopentane by heating with an aqueous alkali to produce a halogenated fluoroisopentene of the formula $$CF_2Cl-CCl-CH=CF_2$$
$$\ \ \ \ \ \ \ |$$
$$\ \ \ \ \ \ \ CF_3$$

and dehalogenating the fluoroisopentene by heating with metallic zinc to produce the corresponding fluoroisoprene.

4. A method of making a polymerizable fluoroisoprene of the formula $$CF_2=C-CH=CH_2$$
$$\ \ \ \ \ \ |$$
$$\ \ \ \ \ \ CF_3$$

which comprises heating a perhalogenated pentafluoropropane of the formula $CF_2Cl-ClCl-CF_3$ with ethylene in the presence of a carboxylic acid peroxide to produce a halogenated fluoroisopentane of the formula $$CF_2Cl-CCl-CH_2-CH_2I$$
$$\ \ \ \ \ \ \ |$$
$$\ \ \ \ \ \ \ CF_3$$

dehydrohalogenating the fluoroisopentane by heating with an aqueous alkali to produce a halogenated fluoroisopentene of the formula $$CF_2-CCl-CH=CH_2$$
$$\ \ \ \ \ |$$
$$\ \ \ \ \ CF_3$$

and dehalogenating the fluoroisopentene by heating with metallic zinc to produce the corresponding fluoroisoprene.

5. The method which comprises heating a perhalogenated pentafluoropropane of the formula $$CF_2Y'-CClY''-CF_3$$

wherein Y' is selected from the group consisting of bromine and chlorine and Y'' is selected from the group consisting of iodine, bromine and chlorine, with an olefin of the formula $$CHX=CX_2$$

wherein the X's are selected from the group consisting of hydrogen and fluorine in the presence of a carboxylic acid peroxide to produce a halogenated fluoroisopentane of the formula $$CF_2Y'-CCl-CH-CX_2Y''$$
$$\ \ \ \ \ \ \ |\ \ \ \ \ \ \ |$$
$$\ \ \ \ \ \ CF_3\ \ \ X$$

References Cited in the file of this patent
UNITED STATES PATENTS

| | | |
|---|---|---|
| 2,615,926 | Benning et al. | Oct. 28, 1952 |
| 2,622,106 | Stover | Dec. 16, 1952 |
| 2,668,182 | Miller | Feb. 2, 1954 |
| 2,670,387 | Gottlieb et al. | Feb. 23, 1954 |
| 2,673,173 | Ruh | Mar. 23, 1954 |
| 2,686,207 | Crane et al. | Aug. 10, 1954 |
| 2,705,229 | Ruh et al. | Mar. 29, 1955 |
| 2,716,109 | Ruh et al. | Aug. 22, 1955 |
| 2,733,278 | Anderson | Jan. 31, 1956 |
| 2,750,431 | Tarrant et al. | June 12, 1956 |
| 2,880,247 | Miller | Mar. 31, 1959 |

OTHER REFERENCES

Bauer, Serial No. 250,066 (A.P.C.) Apr. 20, 1943.
Tarrant, WADC Technical Report, 55–220, Aug. 1955, p. 33.